(12) United States Patent
Krug et al.

(10) Patent No.: US 9,010,114 B2
(45) Date of Patent: Apr. 21, 2015

(54) AIR CHARGE SYSTEM AND METHOD FOR AN INTERNAL COMBUSTION ENGINE

(71) Applicant: The Boeing Company, Chicago, IL (US)

(72) Inventors: David S. Krug, Kirkland, WA (US); Travis A. Reynolds, Lake Stevens, WA (US); Ian Whiteside, Brixworth (GB); Christopher J. Thompson, Brixworth (GB); Phil McGovern, Brixworth (GB); Steve Higginson, Brixworth (GB); Vladimir Anton, Northampton (GB)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 13/770,143

(22) Filed: Feb. 19, 2013

(65) Prior Publication Data

US 2014/0230430 A1 Aug. 21, 2014

(51) Int. Cl.
*F02B 33/44* (2006.01)
*F02M 25/07* (2006.01)
(Continued)

(52) U.S. Cl.
CPC .......... *F02M 25/077* (2013.01); *F02B 29/0412* (2013.01); *F02B 37/04* (2013.01); *F02B 37/16* (2013.01); *F02D 41/0007* (2013.01); *F02B 47/08* (2013.01)

(58) Field of Classification Search
CPC ........ F02B 37/013; F02B 37/16; F02B 39/10; F02B 37/183; F02B 37/004; F02B 37/14
USPC ................ 60/602, 605.1, 607–608, 611, 612; 123/562, 563, 564
See application file for complete search history.

(56) References Cited

U.S. PATENT DOCUMENTS 3,257,797 A * 6/1966 Lieberherr ...................... 60/611
3,355,877 A * 12/1967 Chaffiotte ...................... 60/612
(Continued)

FOREIGN PATENT DOCUMENTS

DE 102007033175 1/2009
EP 0349151 1/1990
(Continued)

OTHER PUBLICATIONS

European Application No. 14155849.4, European Search Report and Search Opinion, May 21, 2014.
(Continued)

*Primary Examiner* — Thai Ba Trieu
*Assistant Examiner* — Ngoc T Nguyen
(74) *Attorney, Agent, or Firm* — Thompson Hine LLP

(57) ABSTRACT

An air charge system for an internal combustion engine may include a charge path having a charge inlet configured to receive air, and a charge outlet configured to convey air to an intake of the internal combustion engine; a first compressor in the charge path, the first compressor being driven by a motor and configured to receive the air from the charge inlet and increase temperature, pressure and volumetric flow rate of the air in the charge path; a first valve in the charge path downstream of the first compressor configured to divert at least a portion of the air leaving the first compressor from exiting the charge path through the charge outlet; and a controller configured to modulate at least one of the first valve and a speed of the motor to adjust a volumetric flow rate of air leaving the charge outlet.

20 Claims, 10 Drawing Sheets

(51) Int. Cl.
*F02B 29/04* (2006.01)
*F02B 37/04* (2006.01)
*F02B 37/16* (2006.01)
*F02D 41/00* (2006.01)
*F02B 47/08* (2006.01)

(56) References Cited

U.S. PATENT DOCUMENTS

| | | | | |
|---|---|---|---|---|
| 3,977,195 | A * | 8/1976 | Treuil | 60/612 |
| 5,105,624 | A * | 4/1992 | Kawamura | 60/612 |
| 6,062,026 | A | 5/2000 | Woollenweber et al. | |
| 6,112,523 | A * | 9/2000 | Kamo et al. | 60/612 |
| 6,311,493 | B1 * | 11/2001 | Kurihara et al. | 60/612 |
| 6,889,503 | B2 | 5/2005 | Hoecker et al. | |
| 6,907,867 | B2 * | 6/2005 | Igarashi et al. | 60/611 |
| 6,920,755 | B2 | 7/2005 | Hoecker et al. | |
| 6,920,756 | B2 | 7/2005 | Hoecker et al. | |
| 7,451,597 | B2 * | 11/2008 | Kojima et al. | 60/611 |
| 7,640,745 | B2 * | 1/2010 | Japikse | 60/612 |
| 7,958,730 | B2 | 6/2011 | Stewart | |
| 8,200,413 | B2 * | 6/2012 | Brooks et al. | 701/103 |
| 8,429,912 | B2 * | 4/2013 | Guggenberger et al. | 60/611 |
| 2004/0194466 | A1 | 10/2004 | Kawamura et al. | |
| 2010/0132355 | A1 | 6/2010 | Michels et al. | |
| 2010/0242899 | A1 * | 9/2010 | Hitomi et al. | 123/564 |
| 2013/0209291 | A1 * | 8/2013 | Kitsukawa et al. | 417/410.1 |

FOREIGN PATENT DOCUMENTS

| | | | |
|---|---|---|---|
| EP | 1391595 | 2/2004 | |
| EP | 1519017 A1 * | 3/2005 | F02B 37/013 |
| FR | 2891311 | 3/2007 | |
| WO | 98/54449 | 12/1998 | |
| WO | WO 2012057191 A1 * | 5/2012 | F02B 37/013 |

OTHER PUBLICATIONS

Holloway, H., "Audi reveals electric turbocharger technology," http://www.autocar.co.uk/car-news/motoring/audi-reveals-electric-turbo-charger-technology (Sep. 21, 2012).

Spinelli, M., "Will BMW's electric turbocharger end turbo lag?" http://jalopnik.com/5855317/will-bmws-electric-turbocharger-end-turbo-lag (Nov. 2, 2011).

"BMW Patents Its Electric Turbocharger Technology. More Power, Less Lag." featured on BIMMERPOST.com, http://www.f30post.com/forums/showthread.php?t=597327 (Oct. 31, 2011).

* cited by examiner

AIR CHARGE SYSTEM AND METHOD FOR AN INTERNAL COMBUSTION ENGINE

FIELD

The present disclosure relates to air charging systems for internal combustion engines and, more particularly, to air charging systems for internal combustion engines that operate at high altitudes.

BACKGROUND

Air vehicles require one or more power plants to provide propulsive power and systems power. The power plants can take a variety of forms, including an internal combustion engine. Depending on the type of aircraft being powered, the engine may need to be run, restarted or started at altitudes up to and exceeding 41,000 ft. (1960 m) with ambient temperature conditions down to and below −65° F. At such an altitude and temperature, atmospheric air pressure may be only 20% that of sea level air pressure.

Accordingly, it is necessary to provide an intake for the internal combustion engine that includes an air charge system to increase the mass flow temperature and/or pressure of the intake air to start up internal combustion engines and run them at a steady state condition to produce sufficient power for the vehicle's needs. Such air charge systems typically may include compressors driven by exhaust air (i.e., turbochargers) and compressors driven by motors (i.e., superchargers) and hybrid variations (i.e., turbochargers with integrated motors) in order to increase mass flow rate of ambient air used by the internal combustion engine. Turbochargers have insufficient power available to extract from the exhaust during engine cranking and initial engine run up to provide sufficient boost pressure to the engine to support operation. Mechanically driven superchargers have insufficient speed during engine cranking and initial engine run up to provide sufficient boost pressure to the engine to support operation.

A problem encountered with such air charge systems is that it is difficult to match the engine air mass flow requirements and the volumetric flow consumed by the engine during all modes of operation, namely, start up, run up to steady state operation, steady state operation at prescribed power output levels, transient operation, and shut down. If mass and volume flow of air is not properly matched between the air exiting the compressors and air charging the cylinders of the engine, surging of the compressors may occur, possibly damaging the compressors, or the engine will develop insufficient power.

Air charge systems have been equipped with bleed valves to prevent an overpressure situation from occurring in the air charge system. However, there is a need for an air charge system in which the volumetric flow rate of air delivered to the associated internal combustion engine may be controlled with precision during all modes of engine operation, and at altitude.

An additional problem encountered is that at low ambient temperatures, the fuel vaporization rate will be significantly reduced, resulting in either reduced power output or a lack of detonation of the fuel within the engine. The engine and/or the engine intake air may have insufficient heat to vaporize the fuel, depending on the operating condition of the engine.

If the internal combustion engine is a compression ignition engine, there must be sufficient pressure and temperature generated within the cylinder to support auto ignition. This pressure is dependent on the engine compression ratio, the intake pressure and engine speed. Operation at extreme altitude conditions significantly drops the entrance pressure, creating additional problems.

SUMMARY

In one aspect, the disclosed air charge system for an internal combustion engine may include a charge path having a charge inlet configured to receive air, and a charge outlet configured to convey air to an intake of the internal combustion engine; a first compressor in the charge path, the first compressor being driven by a motor and configured to receive the air from the charge inlet and increase temperature, pressure and mass flow rate of the air in the charge path; a first valve in the charge path downstream of the first compressor configured to divert at least a portion of the air leaving the first compressor from the charge path through the charge outlet; and a controller configured to modulate at least one of the first valve position and a speed of the motor to adjust a volumetric flow rate of air leaving the charge outlet.

In another aspect, an air charge system for an internal combustion engine may include a charge path having an inlet configured to receive air from ambient, and an outlet configured to be connected to an intake of the internal combustion engine to convey air from the inlet to the intake of the internal combustion engine; a first compressor in the charge path connected to receive air from the inlet; a first charge cooler in the charge path connected to receive air from the first compressor; a second compressor in the charge path connected to receive air from the first charge cooler; a first variable bypass valve connected to divert at least a portion of the air from the charge path upstream of the first compressor to convey at least a portion of the air around at least one of the first compressor and the first charge cooler, and back to the charge path; and a controller connected to the first variable bypass valve for varying an amount of air flowing around the charge cooler, to maintain an optimal temperature entering the internal combustion engine.

In yet another aspect, a method for providing charge air to an internal combustion engine may include conveying ambient air through a charge path from an inlet of the charge path to an intake of the internal combustion engine; activating a first compressor in the charge path, the first compressor being driven by a motor and configured to compress the air in the charge path to increase a temperature, pressure and mass flow rate of the air in the charge path; measuring charge air conditions in the charge path; and modulating a volumetric flow of the air to the intake by at least one of diverting at least a portion of the air leaving the first compressor from the charge path and modulating a speed of the motor.

Other objects and advantages of the disclosed system and method will be apparent from the following description, the accompanying drawings, and the appended claims.

DETAILED DESCRIPTION

Figure 2:
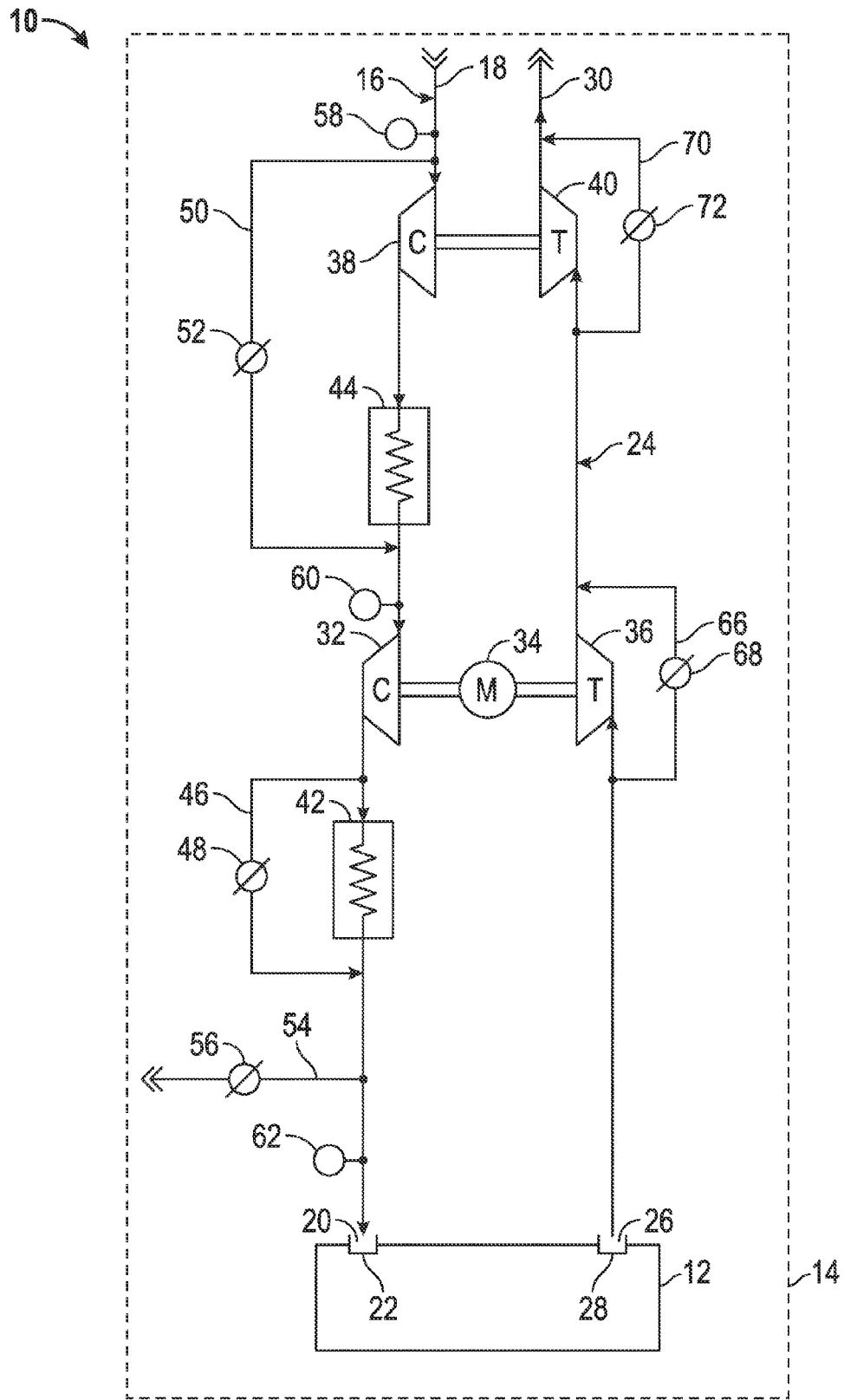
FIG. 2 is a schematic of an embodiment of the disclosed air charge system.

As shown in FIG. 2, in an embodiment, the air charge system for an internal combustion engine, generally designated 10, is configured to interface with an internal combustion engine 12 that may be mounted on a vehicle 14, such as an aircraft. In an embodiment, the internal combustion engine 12 may be a compression ignition engine, a spark ignition engine, a piston engine, or a rotary engine. In embodiments, the vehicle 14 may be an air vehicle, or an aircraft, or a land vehicle, or a marine vessel such as a surface ship.

The air charge system 10 may include a conduit forming a charge path 16 and having a charge inlet 18 configured to receive air, and a charge outlet 20 configured to convey air to an intake 22 of the internal combustion engine 12, which in an embodiment may be an intake manifold. The air charge system 10 also may include a conduit forming an exhaust path 24 having an exhaust inlet 26 configured to receive exhaust air from the exhaust 28 of the internal combustion engine 12 and an exhaust outlet 30 configured to exhaust air from the internal combustion engine 12 to the ambient (such as to an environment surrounding the vehicle 14). The air charge system 10 also may include a first compressor 32 that may be driven by a motor 34, and in the embodiment of FIG. 1, include a turbine 36. The compressor 32 may be in the charge path system 16 and the turbine 36 may be in the exhaust path 24. The motor may be an electric motor, a pneumatic motor, hydraulic motor, or other type of mechanical motor.

The air charge system 10 also may include a second compressor 38 which may be driven by a second turbine 40. The second compressor 38 and turbine 40 may function together as a turbocharger in the system 10. Compressor 38 may be in the charge path 16, and the turbine 40 may be on the exhaust path 24. Thus, charge path 16 includes first and second compressors 32, 38 arranged serially.

A first charge cooler 42 may be positioned on the charge path 16 downstream of the first compressor 32, and a second charge cooler 44 on the charge path 16 positioned downstream of the second compressor 38 and upstream of the first compressor 32 on the charge path 16. A bypass path 46, which in an embodiment may be a line or duct, may be attached to the charge path 16 and may be connected to divert air flowing to the charge outlet 20 around the first charge cooler 42, and may include a variable bypass valve 48. A second bypass path 50, which in an embodiment may be a line or duct, may be positioned on the charge path 16 to divert air from a location upstream of the second compressor 38 to a location downstream of the second cooler 44, and may include a variable bypass valve 52.

A bleed vent 54 may be positioned on the charge path 16 at a location downstream of the first compressor 32, charge cooler 42 and first bypass path 46. The bleed vent 54 may include a bleed valve 56 for diverting at least a portion of the air leaving the first compressor 32 from flowing to the charge outlet 20.

The charge path 16 may include a sensor 58 positioned between the charge inlet 18 and the bypass path 50, and a sensor 60 positioned downstream of the second charge cooler 44 and second bypass path 50, and upstream of the first compressor 32. Charge path 16 may include a sensor 62 positioned downstream of the bleed vent 54 and upstream of the charge outlet 20. In an embodiment, the sensor 60 may be connected to the intake 22. The sensors 58, 60, 62 may be selected to sense pressure, temperature, and/or mass flow rate of charge air flowing through the charge path 16 at their respective locations.

A first exhaust bypass path 66 may be located on the exhaust path 24 and include a variable bypass valve 68. The exhaust bypass path 66 may be configured to divert exhaust gas around the turbine 36 on the exhaust path 24. Alternately, turbine 36 also may have a variable turbine geometry that works in conjunction with exhaust gas bypass path 66 and variable bypass valve 68, or eliminates the need for the gas bypass path 66 and variable bypass valve 68. Similarly, an exhaust bypass path 70, which in an embodiment may be a line or duct, may be positioned on the exhaust path 24 and include a variable bypass valve 72. The exhaust bypass path 70 may be configured to divert exhaust gas around the second turbine 40 on the exhaust path 24. Alternately, turbine 40 also may have a variable turbine geometry that works in conjunction with exhaust gas bypass path 70 and variable bypass valve 72, or eliminates the need for the gas bypass path 70 and variable bypass valve 72. Variable turbine geometry position may be controlled by controller 74.

Figure 1:
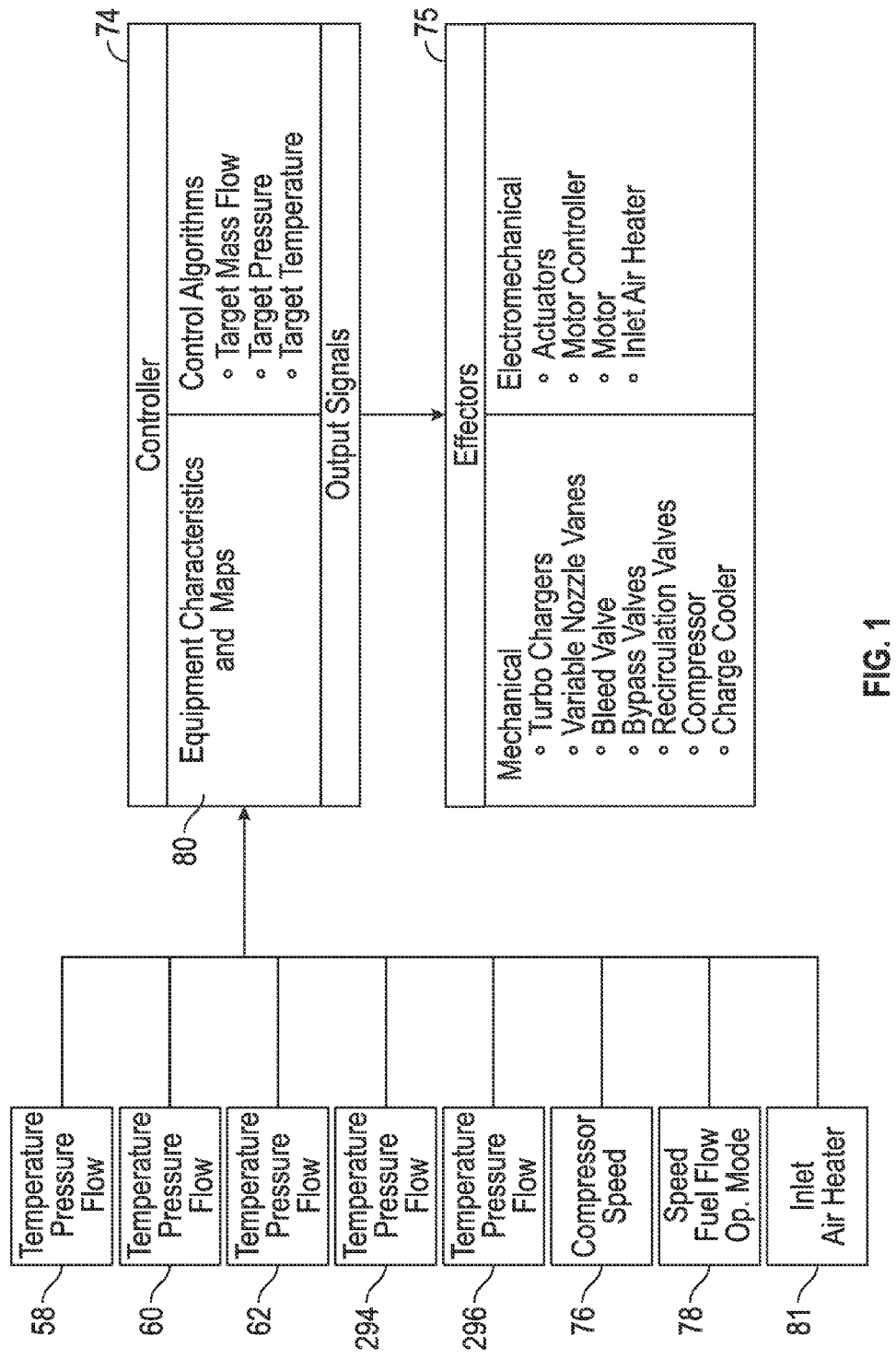
FIG. 1 is a control schematic of the disclosed air charge system and method for an internal combustion engine.

As shown in FIGS. 1 and 2, the air charge system 10 also may include a controller, generally designated 74. In the embodiment of FIG. 1, the controller 74 may receive inputs from sensors 58, 60, and 62 that provide data on the characteristics of the air flowing through the charge path 16. Such information may include data on air temperature, air pressure and/or the mass flow rate of the air at the location of the sensors 58, 60, and/or 62 on the charge path 16. The controller 74 may generate output control signals to various effectors 75 that control the behavior of the system 10. The various effectors 75 will be described subsequently in detail.

The air charge system 10 also may include a sensor 76 that is connected to receive data regarding the speed, such as a rotational speed, of the first compressor 32 and any additional compressors, such as compressor 38. The engine 12 also may include a sensor 78 that provides information to the controller 74 (FIG. 1) regarding engine speed, fuel flow, and/or engine mode, namely, start up, transition, steady state operation, and shut down.

The controller 74 may include a database 80 containing information on operational characteristics of the effectors 75, including the first compressor 32, second compressor 38 and engine 12. Database 80 also may include data representing compressor maps. Such compressor maps may be developed for specific models of compressor and include information correlating pressure ratio and corrected mass flow, or pressure ratio and volumetric flow, and also may include efficiency rings and/or efficiency ellipses. Such data may correlate, for a required engine power output, and engine speed, a targeted mass flow of charge air and pressure ratio increase. Similar data for the turbochargers in the air charge system 10 may be included. For a turbocharger configuration in which the compressor wheel is connected to a turbine wheel that supplies mechanical power to rotate the compressor (e.g., compressor 38 and turbine 40), data corresponding to the performance map of the turbine wheel (mass flow correlated to pressure ratio) may be included in database 80.

The controller 74 may use a multi-variable control algorithm to run the two compressors 32, 38 at the optimal efficiency locations on the combined compressor maps for the respective compressors. Further, the multi-variable algorithms that control the two compressors 32 and 38 and the bleed valve 56, may vary the volumetric flow of air into the engine 12 depending on the power required of the engine, or the engine speed, along with maintaining the required boost pressure levels corresponding with changes in altitude or ambient temperature. The algorithms also receive data from sensors 62 and 78 to keep cylinder pressure in the engine 12 below maximum, especially when determining an initial amount of charge pressure.

The controller 74 may provide output signals to the motor 34 to control the speed of the compressor 32. Controller 74 also may provide signals to bypass valves 48 and 52 to vary the amount of air bypassing the first charge cooler 42 and second charge cooler 44 to control the temperature of the charge air entering the engine and minimize pressure losses to compressor 32. Similarly, controller 74 may provide signals to control exhaust bypass valves 68, 72 in bypass paths 66, 70, to vary the flow of exhaust air through the exhaust path 24 around turbine 36 and the turbine 40, respectively, from no flow of exhaust air through either one of turbine 36 or turbine 40, to 100% flow of exhaust air through either one of turbine 36 or turbine 40.

The operation of the embodiment of the air charge system 10 of FIG. 1 is as follows. On start-up of the engine 12, charge air may enter the inlet 18, and the charge air conditions may be measured by sensor 58. Such conditions may include temperature, pressure, mass flow or any combination thereof. During start-up, bypass valve 52 may be opened by controller 74 to allow charge air to flow around the compressor 38 and charge cooler 44 to minimize pressure restrictions in the charge path 16. Charge air conditions may be measured again at sensor 60, and may include temperature, pressure, mass flow or any combination thereof.

The motor 34 may be activated by the controller 74 to a pre-set charge air pressure determined by the control algorithm, and mass flow output conditions may be measured by the sensor 62 downstream of the compressor 32. Because the compressor 32 increases the pressure and mass flow rate of the charge air flowing through the charge path 16, the temperature of the air increases due to the compression.

During start-up, the controller 74 may open bypass valve 48, which allows charge air to flow around the charge cooler 42 so that cooling of the charge air may be minimized. The controller 74 also may modulate the vent valve 56 on the bleed vent 54. During startup, motor 34 may provide the initial power and rotation to compressor 32 to pressurize the charge air system. Also during start-up, controller 74 may open and modulate the valve 56 sufficiently to prevent compressor surge at the motor-assisted compressor 32, while insuring that proper volumetric air flow may be provided to the engine 12 at the desired pressure while the engine is being cranked by a starter (not shown). Signals relating to charge air conditions in the charge path 16 measured by sensor 62, in conjunction with charge air conditions from sensors 58 and 60 and motor speed from sensor 76, may be read by controller 74 and used to control the position of the vent valve 56 to ensure proper volumetric flow and pressure of charge air to the engine 12, while preventing choking of compressor 32. The temperature of the charge air may be maximized to facilitate fuel vaporization and rapid starting of the engine.

The exhaust from the engine 12 leaving the exhaust outlet 28 is ducted to the turbine 36 of the electric motor assisted compressor 32. Exhaust bypass valve 68 is modulated by the controller 74 so that the turbine 36 may be rotated by exhaust gases in the exhaust path 24 to rotate the compressor 32 and thereby assist the motor 34 during start up. The controller 74 may modulate the exhaust bypass valve 72, opening the exhaust bypass valve to bypass the exhaust air flow around the turbine 40 in order to reduce backpressure in the exhaust path 24. This may allow more work to be extracted from the turbine 36. The exhaust air is vented through exhaust outlet 30 to the ambient.

For steady state operation of the engine 12, charge air enters the inlet 18 and charge air conditions may be measured by sensor 58. During steady state operation of the engine 12, the bypass valve 52 may be closed so that charge air is pressurized by the compressor 38 in the charge path 16. Intercooler 44 may cool the charge air heated by the compressor 38. Charge air conditions may be measured by sensor 60 and data may be used by the controller 74 in conjunction with data from sensors 60 and 62 to modulate the position of the exhaust bypass valves 68 and 72 to ensure the compressor 38 and compressor 32 are operating at an optimal combined efficiency.

Motor 34 operates compressor 32 to a preset charge air pressure determined by a stored control algorithm and transmitted by controller 74. The air pressure output condition from compressor 32 is measured by downstream sensor 62. The charge air in charge path 16 may be heated as a result of being compressed by compressor 32. Controller 74 may close the bypass valve 48, which may direct some or all of the charge air exiting the compressor 32 through the charge cooler 42. Controller 74 may close bleed vent valve 56 so that all of the air flowing downstream from compressor 32 leaves charge outlet and enters intake 22 of the engine 12. During transient speed or power conditions of engine 12, the motor 34 may be energized by the controller 74 to provide rapid power to compressor 32 to increase charge air pressure and mass flow to the engine 12. The increased charge air pressure and mass flow may result in faster response time as compared to relying on just response from the turbine 36, otherwise known as turbo lag.

The charge air conditions may be measured by controller 74 at sensor 62 and used in conjunction with readings from sensors 58 and 60 to control the position of the exhaust bypass valves 68, 72 to ensure proper flow and pressure of the charge air entering the engine 12. The exhaust air leaving the exhaust 28 of the engine 12 and entering exhaust inlet 26 may be ducted to the turbine 36. Controller 74 may modulate the bypass valve 68 according to the stored control algorithm to ensure that the compressor 32 is operating at the optimal condition. The motor 34 may or may not be actuated by the controller 74 at this time, depending on the need for additional power beyond what the turbine 36 may provide. In an embodiment, if the turbine 36 is operating at excessive speed, the controller may actuate motor 34 to run as a generator to slow down the speed of the compressor 32 and generate power for use elsewhere.

Exhaust air may continue to flow downstream through exhaust path 24 to turn turbine 40, which in turn may turn compressor 38. Bypass valve 72 may be modulated by controller 74 according to the stored control algorithm so that some exhaust flow may be ducted around the turbine 40. This configuration ensures that the compressor 38 may be operating at an optimal condition. The exhaust air may then flow through exhaust outlet 30 to ambient.

Figure 3:
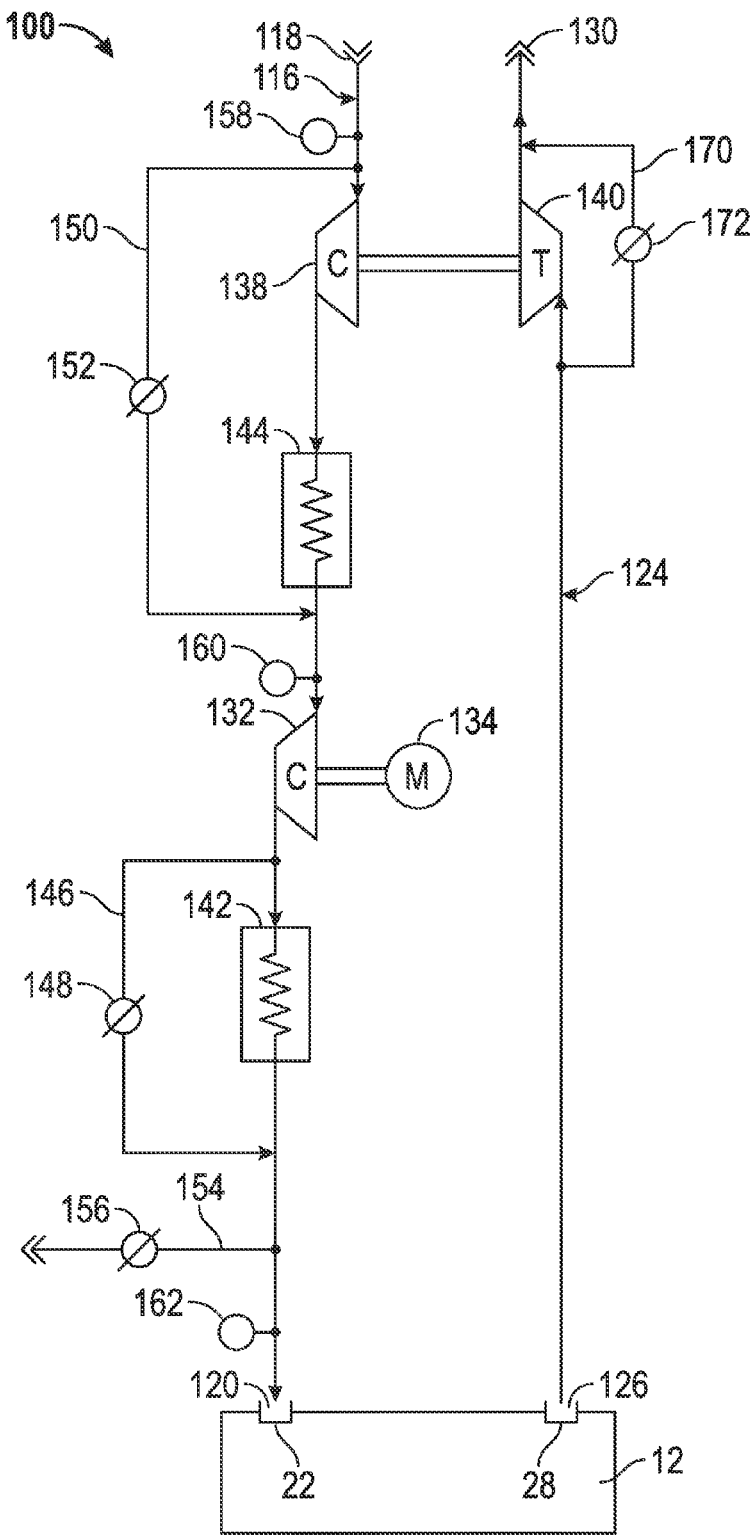
FIG. 3 is a schematic of a second embodiment of the disclosed air charge system.

As shown in FIG. 3, a second embodiment of the air charge system 100 may vary from the embodiment shown in FIG. 1 in that the system may include a compressor 132 driven by a motor 134, but without the turbine 36 and bypass path 66 of the system 10 shown in FIG. 1. The operation of the embodiment 100 of FIG. 3 may be as follows. For start-up, the charge air may enter the inlet 118 of the charge path 116, and conditions may be measured by sensor 158. During start up, controller 74 (FIG. 1) may open bypass valve 152 so that charge air may be ducted around compressor 138 and charge cooler 144 through bypass path 150. Charge air conditions may be read by controller 74 at sensor 160. The controller 74 may actuate the motor 134 to drive the compressor 132 to a pre-set charge air pressure output condition according to a stored control algorithm. The output condition may be measured by sensor 162, accounting for upstream conditions measured at sensor 160. The charge air may be heated as a result of being acted upon by compressor 132. The controller 74 may open bypass valve 148 to duct air flow around charge cooler 142 so that cooling and pressure losses may be minimized.

At this time, controller 74 may modulate bleed vent valve 156 to prevent an air surge or a choking of the compressor 132, while ensuring proper air flow to the engine intake 22 through charge path outlet 120. Also during this start-up phase, the controller 74 may open bypass valve 172 to allow bypass path 170 to duct exhaust air flowing through exhaust path 124 out the exhaust path outlet 130 to ambient.

For steady state operation of the embodiment 100 of FIG. 3, charge air may enter the inlet at 118 and charge air conditions may be measured by sensor 158. Controller 74 may modulate bypass valve 152 and bypass 150, which may cause the charge air to be compressed by compressor 138 and cooled by charge cooler 144. Charge air conditions may be measured by sensor 160 and the data may be used by controller 74 in conjunction with data from sensors 158 and 162, and sensor 76 (FIG. 1) on compressor 138, which may provide data on compressor speed, so that controller 74, using multivariable control, may modulate the position of the bypass valve 172 on bypass 170 to vary the flow of exhaust air to turbine 140 so that the turbine may turn the associated compressor 138 to operate at a condition that may result in a combined optimal efficiency for compressor 132 and compressor 138 for a needed pressure rise in the charge air system 100.

The controller 74 also may operate motor 134 to a prescribed charge air pressure output condition, as measured by sensor 162. Speed control of the compressor 132 may be based on the operating point of compressor 132 and sensor data from the sensors 158, 160, and/or 162. The charge air in charge path 116 may be heated by the compressor 132 due to compression. The controller 74 may modulate the bypass valve 148, which may direct air flowing downstream from compressor 132 through the charge cooler 142 to be cooled. Controller 74 may modulate vent valve 156. Charge air conditions may be measured by sensor 162 and/or sensor 160 at that time and used to control the position of bypass valve 172 and speed of compressor 132, measured by sensor 176, to ensure proper flow and pressure of the charge air entering the engine 12.

Exhaust from the engine 12 leaving exhaust outlet 28 may travel through exhaust path 124 and may be ducted directly to the turbine 140. Controller 74 may modulate the bypass valve 172 to ensure that the compressor 138 is operating at optimal condition. Exhaust air may then be vented to the ambient through exhaust path outlet 130. Alternately, turbine 140 also may have a variable turbine geometry that works in conjunction with exhaust gas bypass path 170 and variable bypass valve 172, or eliminates the need for the gas bypass path 170 and variable bypass valve 172. Variable turbine geometry position would be controlled by controller 74.

Figure 4:
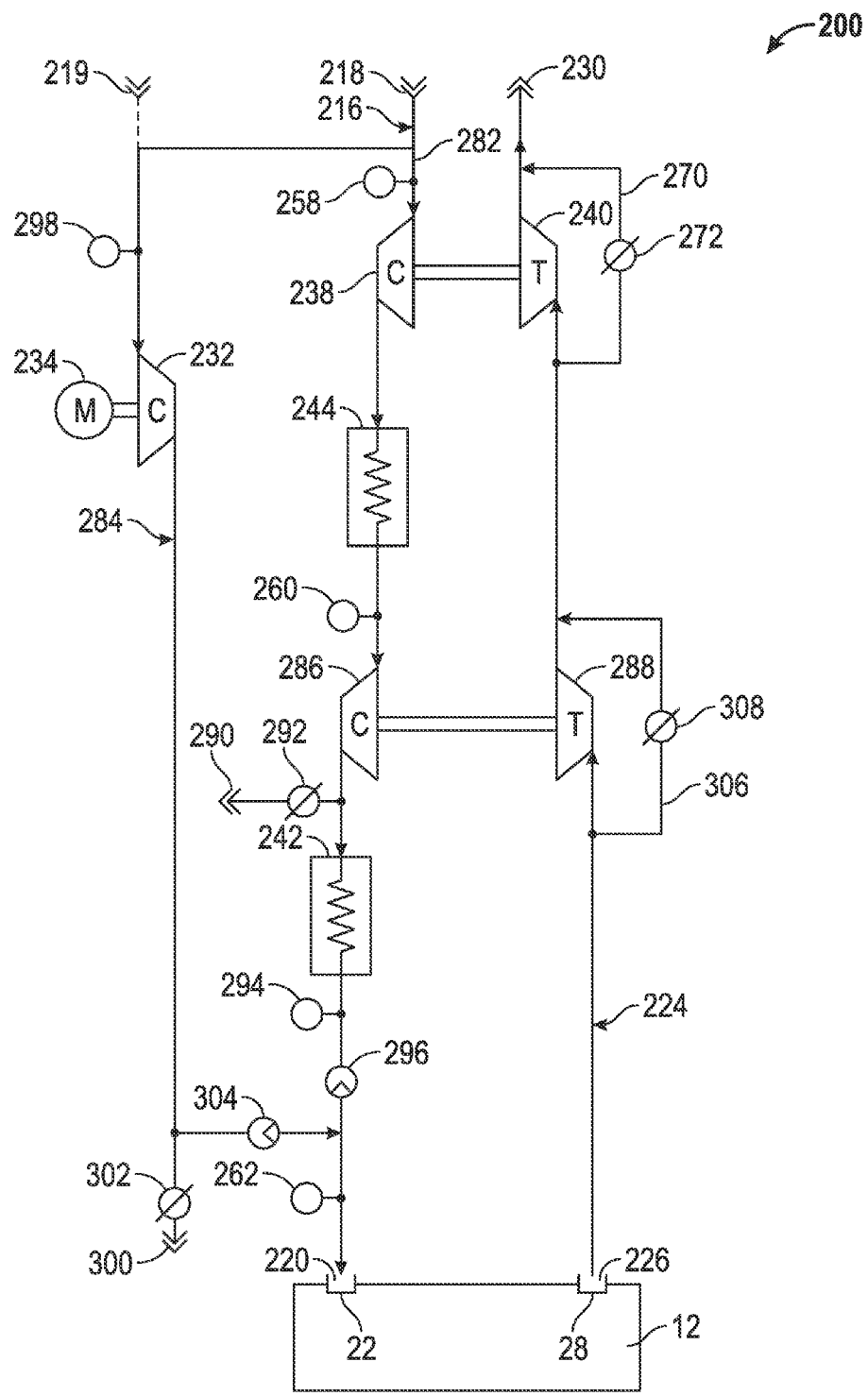
FIG. 4 is a schematic of a third embodiment of the disclosed air charge system.

As shown in FIG. 4, an embodiment of the air charge system, generally designated 200, may include a charge path 216 that includes a primary charge path 282 and a bypass charge path 284, which in an embodiment may be a line or a duct. The primary charge path 282 may include an intake 218, inlet sensor 258, compressor 238, which may be a turbocompressor run by exhaust turbine 240, charge cooler 244, sensor 260, a third compressor 286, which may be a turbocompressor run by exhaust turbine 288, bleed vent 290 carrying bleed valve 292, a second charge cooler 242, a sensor 294 selected to read one or more of temperature, pressure and air flow (see also FIG. 1), and a valve 296, which may be either a check valve or actuated valve controlled by controller 74.

Bypass charge path 284 may be connected to the primary charge path 282 at a point upstream of the sensor 258 and downstream of the inlet 218, or share the inlet 218 with the primary charge path, and connect with the primary charge path 282 at a point downstream of the valve 296 and upstream of the charge outlet 220, that may be connected to the intake 22 of the internal combustion engine 12. In an embodiment, the bypass charge path 284 may have its own inlet 219 that may be separate from the primary charge path 282, and would not receive charge air from charge inlet 218. The bypass charge path 284 may include a sensor 298, selected to read one or more of temperature, pressure and air flow, that communicates with controller 74 (see FIG. 1), a compressor 232 driven by motor 234, and a bleed vent 300 having a variable bleed valve 302 that is controlled by controller 74.

The bypass charge path 284 also may include a check valve or actuated valve 304 upstream of the connection of the bypass charge path 284 with the primary charge path 282, which is between valve 296 and sensor 262. If valve 304 were actuated, it may be controlled by controller 74. The exhaust path 224 may include turbine 288, bypass path 306, which in an embodiment may be a line or a duct, and bypass valve 308 for ducting exhaust air around turbine 288, turbine 240, and exhaust gas bypass path 270, which in an embodiment may be a line or a duct, having variable bypass valve 272 for ducting exhaust gases around turbine 240. Alternately, turbine 288 also may have a variable turbine geometry that works in conjunction with exhaust gas bypass 306 and variable bypass valve 308, or eliminates the need for the gas bypass path 306 and variable bypass valve 308. Alternately, turbine 240 also may have a variable turbine geometry that works in conjunction with exhaust gas bypass path 270 and variable bypass valve 272, or eliminates the need for the gas bypass path 270 and variable bypass valve 272. Variable turbine geometry position would be controlled by controller 74.

The start-up procedure for the embodiment of the air charge system 200 of FIG. 4 is as follows. Charge air may enter the inlet 218 and charge air conditions may be measured by sensor 298 on bypass charge path 284. The readings may be transmitted to controller 74. The controller 74 may actuate motor 234 to run compressor 232 to a speed where the compressor creates a preset pressure calculated by the control algorithm stored in the controller 74. During start-up, the valve 304 on bypass charge line 284 may be open, which may allow charge air to bypass the compressors 238 and 286 in the primary charge path 282. Because the compressor 234 may raise the pressure in the bypass charge path 284, the valve 296 may be closed, which may prevent charge air from flowing upstream of the valve 296 through primary charge path 282. Thus, charge air flowing through bypass charge line 284 may flow through charge outlet 220 and into the intake 22 of the internal combustion engine 12.

Controller 74 may modulate the vent valve 302 on bleed vent 300 to prevent an air surge or choking of the compressor 232, while at the same time ensuring that air flow to the engine 12 while it is being cranked by a starter (not shown) may be within a desired range according to a stored control algorithm.

During start-up, charge air conditions within the bypass charge path 284 and immediately upstream of the charge outlet 220 may be monitored by the sensors 298 and 262, and readings may be used by the controller 74 to control the speed of the motor 234 driving compressor 232, as well as modulating the position of the vent valve 302, to ensure proper flow and pressure of charge air to the engine 12 while preventing surge or choking of compressor 232. Bypass valves 308 and 272 may be opened at this time, allowing exhaust air flowing through exhaust path 224 to be ducted around turbines 288 and 240. By opening bypass valves 308 and 272, back pressure in the exhaust path 224 may be reduced. Exhaust air may then be vented to the ambient through exhaust outlet 230. The vent valve 302 may be modulated, and the vent valve 292 may be modulated open by the controller 74 during run-up to a steady-state operation, and thereafter closed during steady-state operation. During transition from start to run-up and then to steady-state, bypass valve 308 and bypass valve 272 may be modulated by controller 74 from open to partially closed, resulting in turbine 288 and turbine 240 powering compressor 238 and compressor 288, respectively. Vent valve 292 may be modulated by controller 74 to a further closed position while vent valve 302 may be further opened. The motor 234 speed may be decreased and then stopped by controller 74. The controller 74 may control motor 234, bypass valve 272, bypass valve 308, vent valve 302, and vent valve 292 during the transition from start to steady-state operation to ensure a continuous increase of engine speed and power without compressor surges or choking.

During steady state operation of the internal combustion engine 12, the air charge system 200 may operate as follows. The controller 74 (FIG. 1) may stop motor 234, which may stop the compressor 232. Thereafter, charge air entering inlet 218 may flow through primary charge path 282 as the path of least resistance. At this time, valve 304 may be closed and valve 296 may be open. Charge air characteristics may be measured by sensor 258 and the charge air may be pressurized by compressor 238. Compressed heated charge air leaving compressor 238 may be cooled by charge cooler 244.

Charge air conditions may be measured at this point by sensor 260 and read by controller 74. This information may be used in conjunction with charge air measurements taken at sensors 258 and 262 by the controller, which then may modulate the position of the exhaust bypass valve 272 to ensure that the compressor 238 may be operating at an optimal condition according to a stored controlled algorithm. Further, the compressor 286 may operate to increase charge air pressure to an output condition measured by the downstream sensor 294. Charge air conditions may be measured by sensor 262 and sensor 260 and used to control the position of the exhaust bypass valves 308 and 272 to ensure the proper flow and pressure of the charge air entering the engine intake 22.

The exhaust leaving the exhaust outlet 28 may flow through exhaust path 224 and may be ducted to the turbine 288, while the controller may modulate the bypass valve 308 to bypass from 0 to 100% of the exhaust flow around that turbine. This may ensure that the compressor 286 may be operated at optimal conditions.

Similarly, the exhaust may be ducted to the turbine 240, while the bypass valve 272 may be modulated by the controller 74 to bypass from 0 to 100% of the exhaust flow around that turbine to ensure that the compressor 238 may be operating at optimal conditions. Compressor 238 and compressor 286 may be operated at their combined optimal condition according to control algorithms in controller 74. The exhaust air may be thereafter vented to the ambient through exhaust outlet 230.

Figure 5:
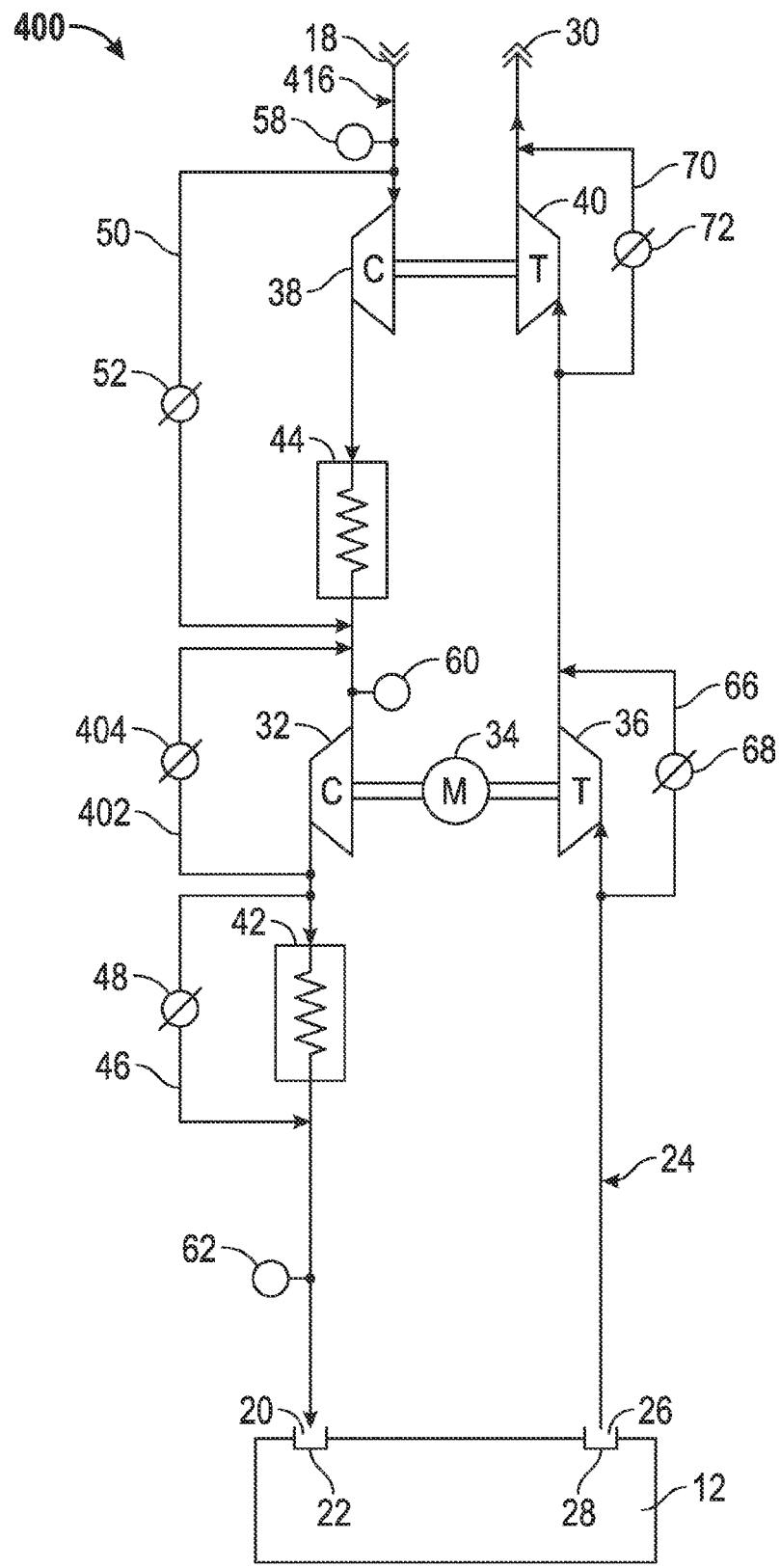
FIG. 5 is a schematic of a fourth embodiment of the disclosed air charge system.

A modification of the charge air system 10 shown in FIG. 2 is shown in FIG. 5 as charge air system 400. Air charge system 400 is similar in construction and operation to the air charge system 10 of FIG. 2, and therefore the same reference numbers are used for corresponding components. The variation of the air charge system 400 is that the bleed vent 54 and bleed valve 56 of the system 10 of FIG. 2 may be removed, and a recirculation path 402 may be provided around compressor 32. A variable recirculation valve 404 may be positioned on the recirculation path and may be controlled by controller 74 (FIG. 1).

When the bleed valve 56 of the air charge system 10 of FIG. 2 vents to ambient downstream of the compressor 32, the recirculation valve 404 may divert a portion of the air flow exiting the compressor 32 in the system 400 to reintroduce it to the charge path 416 upstream of the compressor 32. This may act to reduce the volumetric flow of the charge air flowing downstream from the compressor 32 into the intake 22 of the engine 12. With the air charge system 400, the controller 74 may monitor the temperature, pressure, mass flow, and therefore volumetric flow, of the charge air at sensor 62 to ensure that the pressure and temperature are within desired limits for start-up and steady operation of engine 12. The controller 74 may then adjust the variable recirculation valve 404 accordingly.

Figure 6:
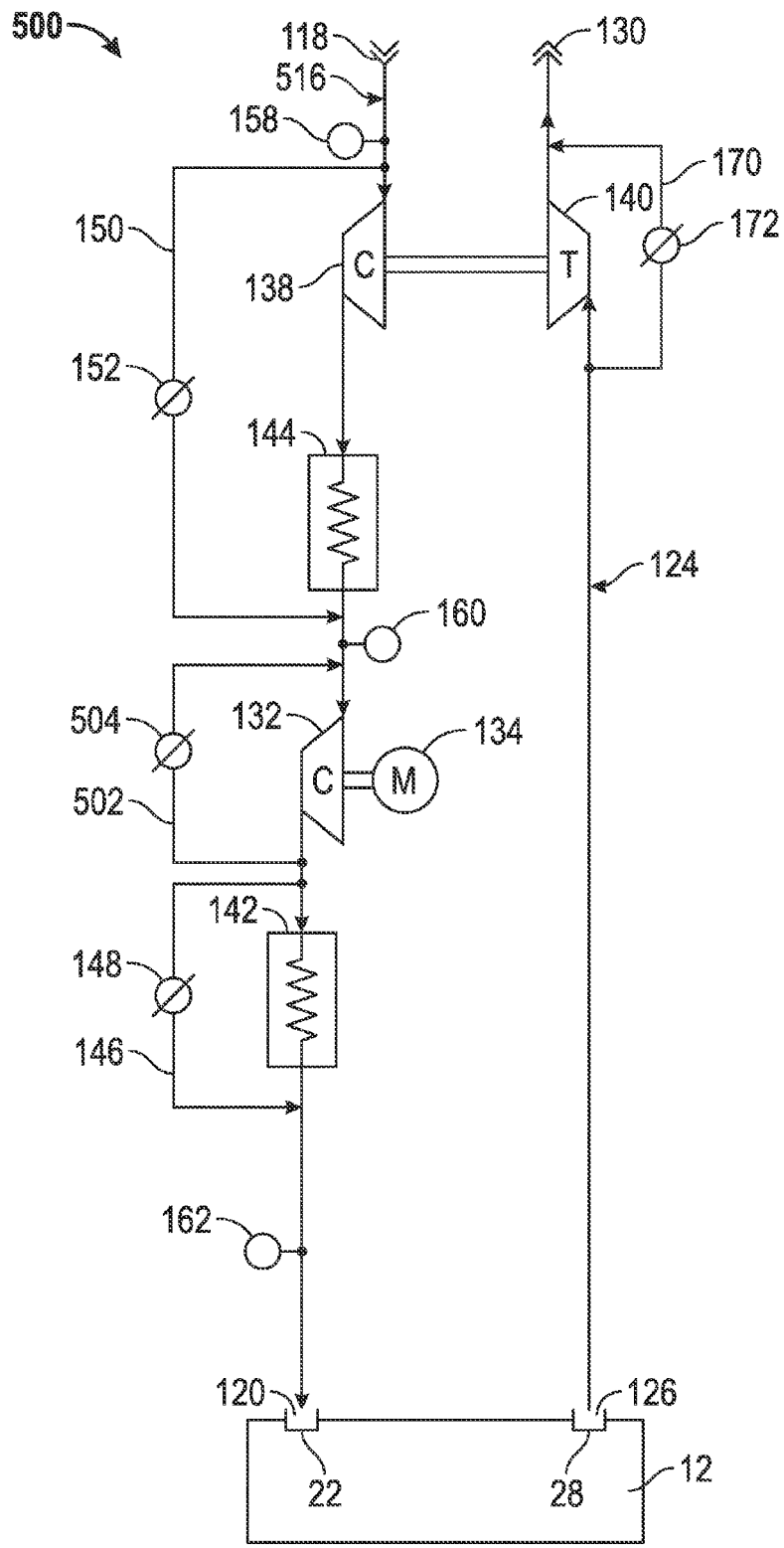
FIG. 6 is a schematic of a fifth embodiment of the disclosed air charge system.

As shown in FIG. 6, another embodiment of the air charge system, generally designated 500, is similar in structure and operation to the embodiment 100 shown in FIG. 3. Accordingly, the same reference numbers are used to identify the same components of the two systems 100, 500, and the two systems function essentially in the same manner during start-up, transitioning and during steady state operation.

The difference of the system 500 in FIG. 6 from the system 100 is that the charge path 516 may not include the bleed valve 156 or the bleed vent 154 of the system 100. Instead, the charge path 516 may include a recirculation path 502 that carries a variable recirculation valve 504 that is modulated by the controller 74. As with the system 400 of FIG. 5, the controller 74 may modulate the opening of the recirculation valve 504 to control the volumetric air flow leaving the compressor 132 and flowing downstream along the charge path 516 to the engine intake 22. The conditions of the charge air may be monitored by sensor 162, which may enable the controller 74 (FIG. 1) to vary the recirculation valve 504 accordingly.

Figure 7:
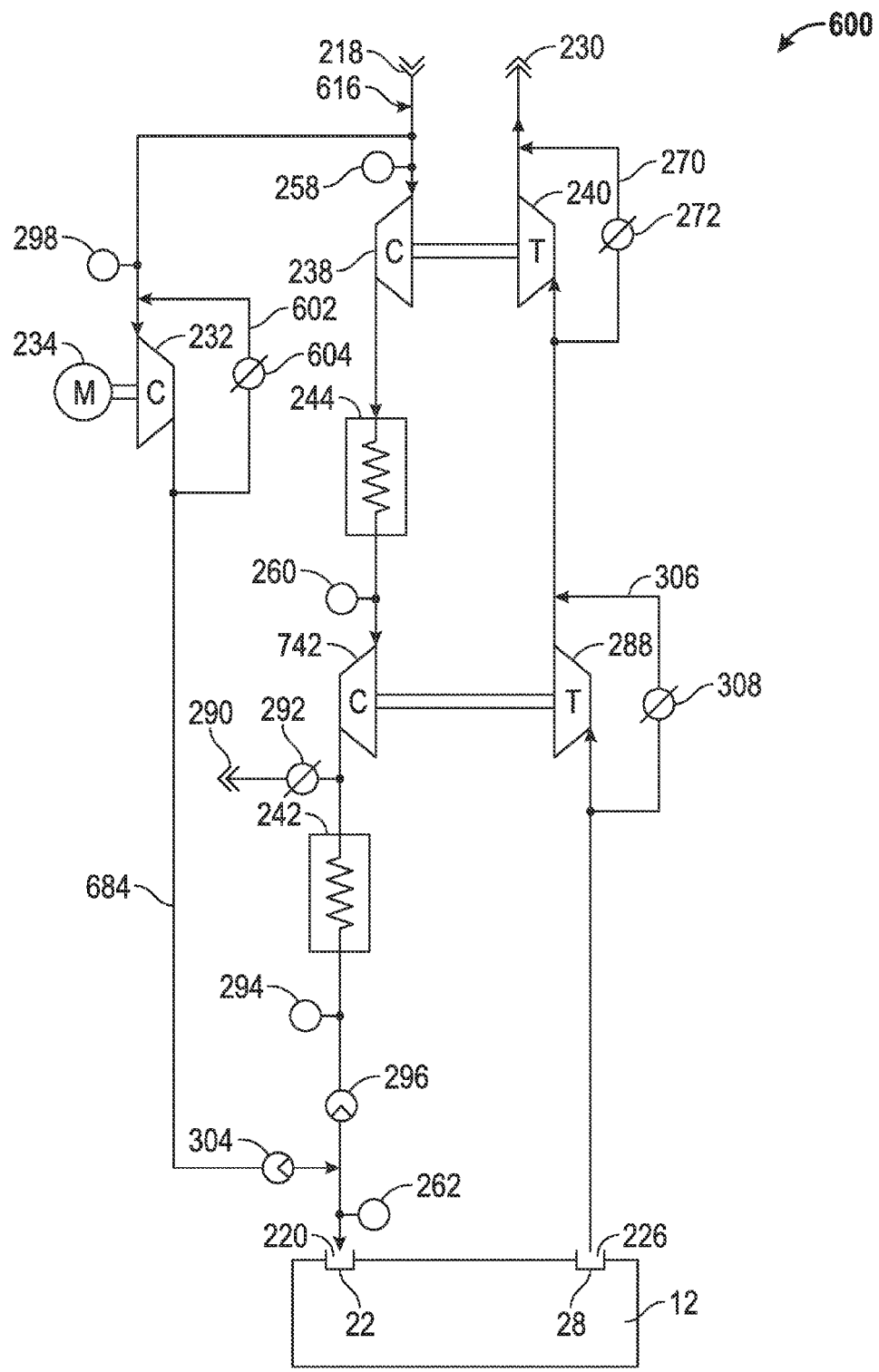
FIG. 7 is a schematic of a sixth embodiment of the disclosed air charge system.

As shown in FIG. 7, an embodiment of the air charge system, generally designated 600, may be similar in construction and operation to the embodiment 200 shown in FIG. 4. With the system 600 of FIG. 7, the same reference numbers are used for the same components that perform in the same manner during start-up, transition and steady-state operation of the internal combustion engine 12.

The difference is that, with the embodiment shown in FIG. 7, the air charge system 600 may include a bypass charge path 684 in which a recirculation path 602 may be connected to duct charge air from a point downstream of the compressor 232 to a point upstream of that compressor. Air flow through the recirculation path 602 is modulated by variable recirculation valve 604, which is controlled by controller 74. Since air flow through bypass charge path 684 may occur only during start up, the recirculation path 602 and recirculation valve 604 may only be in use during start up. As with the embodiments of FIGS. 5 and 6, the controller 74 may modulate the recirculation valve 604 to control the volumetric flow rate of charge air flowing through the bypass charge path 684 during start up. The conditions of the charge air entering the intake 22 of the internal combustion engine 12 may be monitored by sensor 262, and data from that sensor and sensor 298 may be used by controller 74 to modulate the recirculation valve 604.

Figure 8:
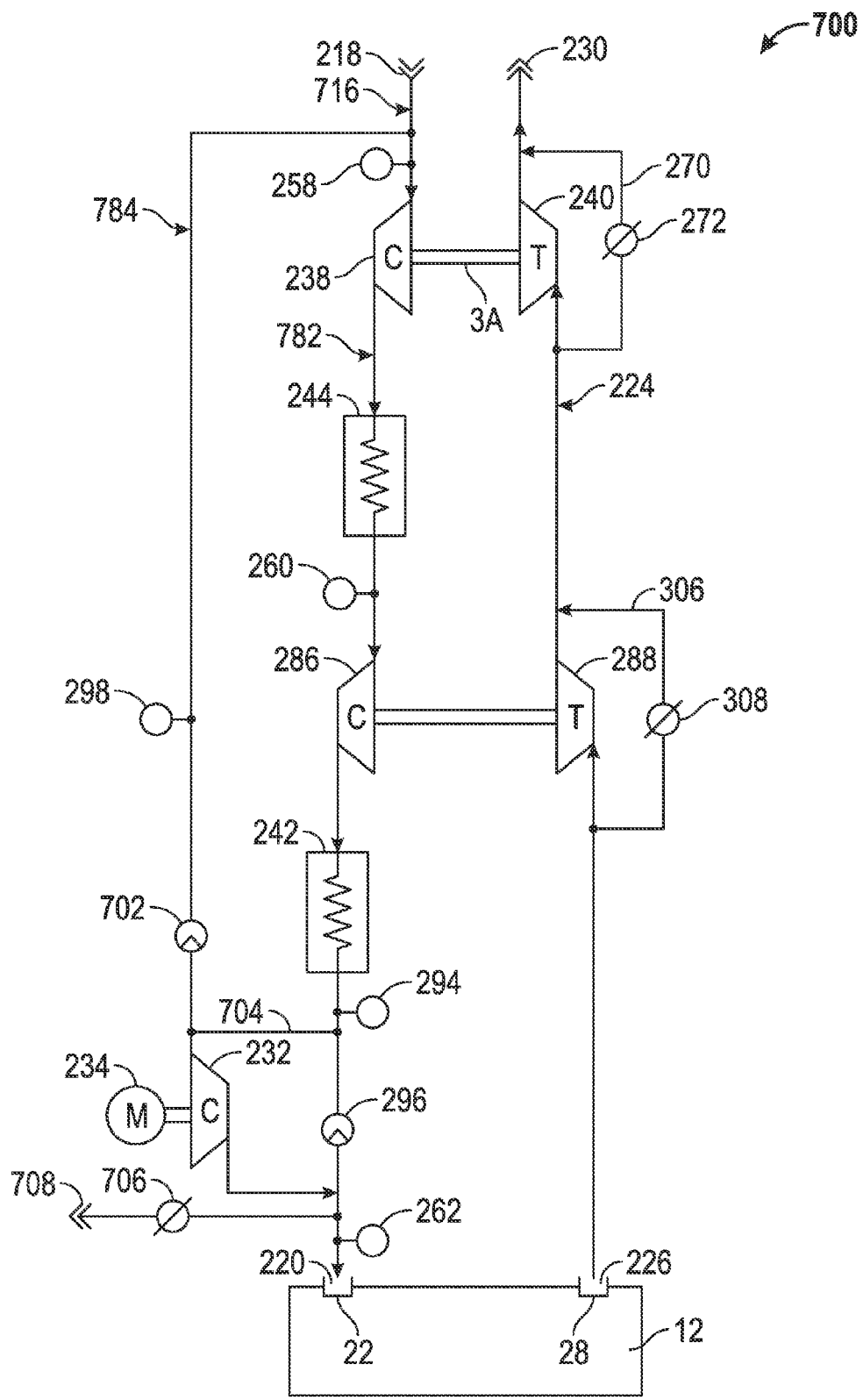
FIG. 8 is a schematic of a seventh embodiment of the disclosed air charge system.

FIG. 8 shows an embodiment of the air charge system, generally designated 700. The air charge system 700 is similar in structure to the air charge system 200 shown in FIG. 4 and described previously. The components of the air charge system 700 appearing in FIG. 8 that are the same as, and perform in the same manner as their counterparts in FIG. 4 are given the same reference numbers. With the air charge system 700 in FIG. 8, the bypass charge path 784 may include a check or actuated valve 702 positioned upstream of the compressor 232. There is an inlet path 704 that may extend from the outlet of the charge cooler 242 to the bypass charge path 784 at a point downstream of the valve 702 and upstream of the compressor 232. Further, the bleed valve 302 and bleed vent 300 in FIG. 4 are removed, and may be replaced by bleed valve 706 and bleed vent 708, which may be located on primary charge path 782 at a point upstream of sensor 262 and downstream of check or actuated valve 296 and the re-entry point of bypass charge path 784.

An advantage of the system 700 over the system 200 of FIG. 4 is that, during steady-state operation of the internal combustion engine 12, the controller 74 may actuate motor 234 to turn compressor 232. This operation may cause the pressure of charge air in the portion of the bypass charge path 784 downstream of compressor 232, and the pressure of the charge air in the primary charge path 782 downstream of check or actuated valve 296, to increase, thereby drawing additional air through the bypass charge path and from the primary charge path through line 704. Thus, the controller 74 may actuate the compressor 232 to provide additional boost to charge air to increase the pressure entering the intake 22 beyond what may otherwise be provided by compressor 286 and compressor 238, depending on the engine 12 operating conditions. This also may allow compressor 236 and compressor 238 to operate at optimal speeds, and yet deliver an increased mass flow rate during start-up and transient operating conditions of engine 12.

Figure 9:
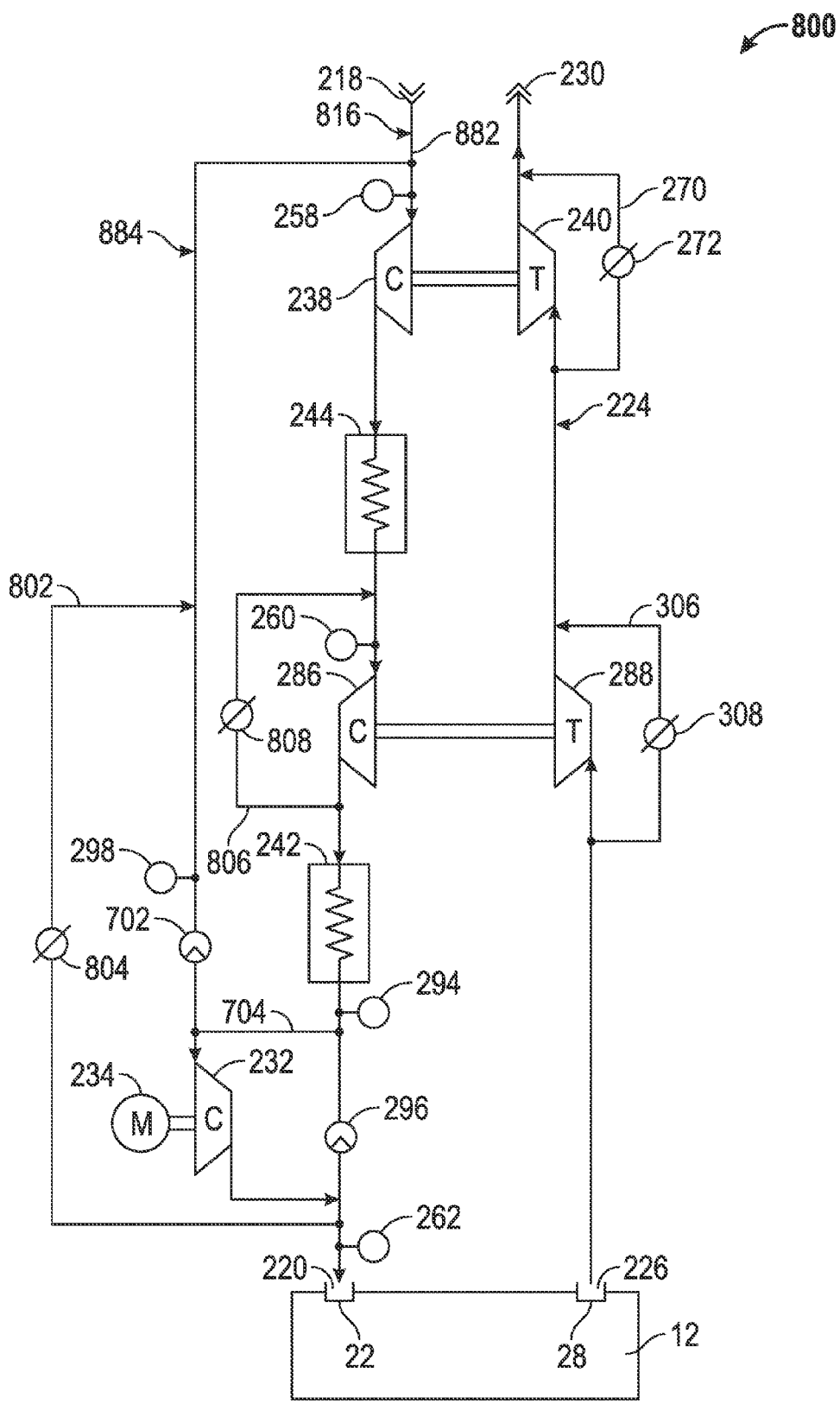
FIG. 9 is a schematic of an eighth embodiment of the disclosed air charge system.

In FIG. 9, an embodiment of the air charge system, generally designated 800, is shown that is similar in structure and function to the embodiment of the air charge system 700 shown in FIG. 8, with the following modifications. Similar components in the embodiment of the system 800 are given the same reference numbers as their counterparts in the air charge system 700 of FIG. 8.

With the air charge system 800, the charge path 816 may include a bypass charge path 884 that may be similar in structure and operation to the bypass charge path 784 of FIG. 8. A recirculation path 802 that may include a variable recirculation valve 804 may be attached to primary charge path 882 at a point downstream of the check or actuated valve 296 and entry point of the bypass charge path 884, and upstream of sensor 262. The recirculation path 802 may be connected to the bypass charge path 884 at a point upstream of the sensor 298, check or actuated valve 702 and compressor 232.

Further, the primary charge path 882 may include a second recirculation path 806 that is connected to the primary charge path 882 at a point downstream of the compressor 286, and upstream of the valve 296, and re-enters the primary charge path at a point upstream of sensor 260 and downstream of charge cooler 244. Second recirculation path 806 may include a second variable recirculation valve 808. Both recirculation valve 804 and second recirculation valve 808 may be modulated by the controller 74 (FIG. 1).

The recirculation path 802 may be used in place of the bleed vent 708 and bleed valve 706 of the system 700 of FIG. 8. During start up operation of the internal combustion engine 12, the controller 74 may take readings of pressure, temperature and mass flow from sensor 262, and accordingly, adjust variable recirculation valve 804 to convey charge air from the primary charge path 882 back upstream along the feedback path 802 to the bypass charge path 884, which may reduce the volumetric flow through the intake 22, matching the volumetric flow needs of engine 12.

Similarly, during start up and steady state operation of the internal combustion engine 12, the controller 74 (FIG. 1) may adjust the second variable feedback valve 808 to allow a portion of the charge air leaving the compressor 286 to be ducted upstream of that compressor, thereby lowering the quantity of charge air flowing through the primary charge path 882 downstream of the compressor 286 and entering charge cooler 242. In an embodiment, the controller 74 may take readings from sensor 294 to determine the volumetric flow rate, and use that data to adjust the second recirculation valve 808 accordingly. Again, with the air charge system 800 of FIG. 9, the compressor 232 may be brought into play to provide additional boost during steady-state operation or transient of the internal combustion engine 12.

Figure 10:
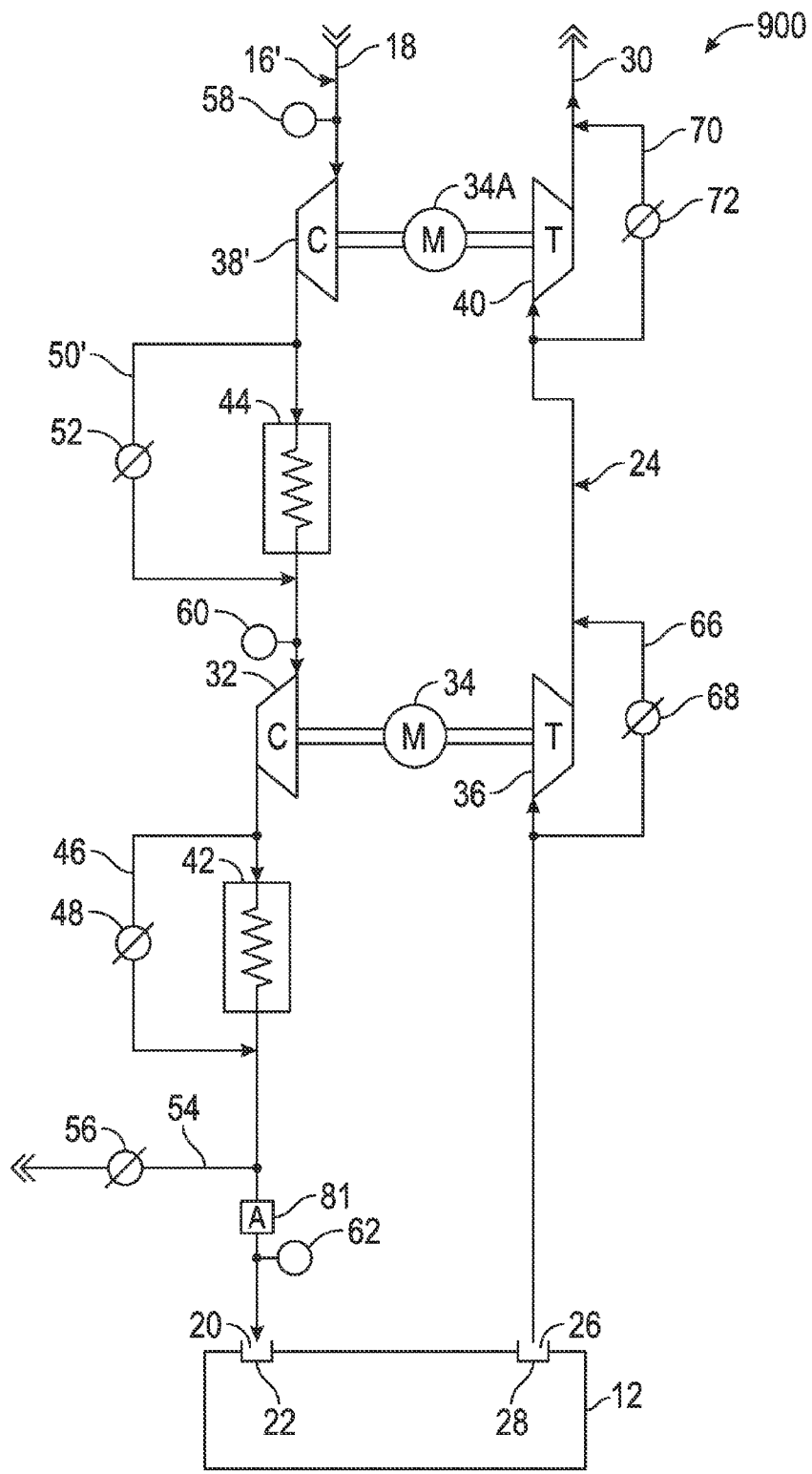
FIG. 10 is a schematic of a ninth embodiment of the disclosed air charge system.

As shown in FIG. 10, in another embodiment of the disclosed invention, generally designated 900, the structures of the charge path 16' and the exhaust path 24 are substantially the same as the charge path 16 and exhaust path 24 of FIG. 2. However, the embodiment 900 may include a motor 34A connected to drive compressor 38'. Motor 34A may be actuated by controller 74 (FIG. 1) and may be varied in speed, to vary the speed, and pressure charge to charge air developed by compressor 38', or disabled, so that the compressor 38' is driven entirely by turbine 40.

By providing two motor-driven compressors 32, 38' in series, the air charge system 900 may provide greater charge air pressure in charge path 16 than for other embodiments. This increased charge air pressure may be desirable during start-up of the engine 12. Such increased charge air pressure may enable the engine 12 to be started at greater altitudes than for a system having none or only a single motor-driven compressor.

Optionally, the system 900 may include an inlet air heater 81 (see also FIG. 1), which may be located downstream of the bleed vent 54 and upstream of the sensor 62 on charge path 16'. Inlet air heater 81 may be a resistance heating coil in the charge path 16' and be controlled by controller 74 (FIG. 1). Controller 74 may actuate inlet air heater 81 to heat air entering the engine intake 22. The inlet air heater 81 may be applied to any of the embodiments described herein and be mounted on their respective charge paths at a location upstream of sensor 62, so that sensor 62 may measure the temperature of charge air entering the engine intake 22. The inlet air heater 81 may enable charge air at optimal temperatures to be provided at high altitudes during engine start up.

In conclusion, the foregoing embodiments of the disclosed air charge system may be ideally suited for starting and operating an internal combustion engine throughout the typical flight envelope of an air vehicle, especially a compression ignition engine. The hardware configurations of the foregoing embodiments, and associated multi-variable control algorithms stored in or accessible by the controller 74, may be optimized to provide sufficient mass flow at the maximum possible pressure and the optimal temperature during engine start-up, transition to steady-state operation, steady-state operation, and shut down. This is because the disclosed systems 10, 100, 200, 400, 500, 600, 700, 800 and 900 are sufficiently flexible to vary volumetric air flow and air temperature to provide optimal charge air conditions to the internal combustion engine 12 throughout its operational speed range. Further, the controller 74 may include algorithms to balance the operation of the one or more turbochargers and the supercharger (i.e., the motor-driven compressor 132) or hybrid turbochargers (i.e., motor-driven and exhaust gas-driven compressor 32) to provide optimal air charge conditions while themselves operating at optimal speeds. This is because the controller 74 may vary the pressure and temperature of charge air entering the engine intake 22 by actuating variable valves to cause varying amounts of charge air to bypass one or more of the turbochargers, one or more of the charge coolers, the motor-driven compressor, and/or to be bled from the charge air path or recirculated to an upstream point of the charge air path and/or change the exit geometry of the turbine sections of the turbochargers.

During start of the internal combustion engine 12 at altitude, when the engine may be cold soaked, a maximum charge temperature may be desired to ensure proper vaporization of the fuel and ignition. During other operating conditions, a minimum charge temperature may be desired so that air density is increased. As the speed of the engine 12 and engine cylinder volume dictate the available volume change during operation, an optimal way to improve the mass flow of oxygen entering the cylinders of the engine 12, which increases power output of the engine, is to increase the charge air pressure and decrease the charge air temperature. This may be effected by the controller 74 by one of varying a speed of one or both turbochargers (depending upon the configuration), varying the charge air flow through one or both coolers, reducing volumetric flow rate of charge air in the charge path, and/or activating, deactivating or varying the speed of the motor-driven compressor 32 (FIG. 2).

Further, by incorporating a motor driving a compressor into an air charge system that includes one or more turbochargers, the motor and compressor may function as an independent unit, or be integrated in series with the turbochargers. The motor-driven compressor may be most valuable during start up and transient conditions, since the controller 74 (FIG. 1) may actuate the motor driving the compressor to provide the needed initial boost pressure, temperature rise and mass flow rate of charge air to support combustion. During steady-state operation, the motor and compressor may be operated in series with the one or more turbochargers to provide additional boost. In other embodiments, shown in FIG. 2 for example, the motor and compressor may be connected to a turbine to provide a source of energy when the connected turbine turns the motor and the motor derives rotational motion from the turbine to act as a power generator, which may enable the elimination of the bypass paths 66, 70, and/or the use of variable geometry turbines, for example, in the system 900 shown in FIG. 10.

The forms of apparatus and methods described herein are not exclusive of the inventions covered by this disclosure, and variations may be made therein without departing from the scope of the invention.

What is claimed is:

1. A method for providing charge air to an internal combustion engine, the method comprising:
    conveying ambient air through a charge path from an inlet of the charge path to an intake of the internal combustion engine;
    activating a compressor in the charge path, the compressor being driven by a motor and configured to compress the air in the charge path to increase a temperature, pressure and mass flow rate of the air in the charge path;
    measuring charge air conditions in the charge path; and
    modulating a volumetric flow of the air to the intake by diverting at least a portion of the air leaving the compressor from the charge path during a start-up of the internal combustion engine and modulating a speed of the motor, wherein diverting the at least a portion of the air leaving the compressor from the charge path includes at least one of venting the at least the portion of the air leaving the compressor and recirculating the at least a portion of the air leaving the compressor to the charge path upstream of the compressor.

2. The method of claim 1, further comprising activating a second compressor in the charge path, the second compressor being driven by a second turbine in an exhaust path extending from an exhaust of the internal combustion engine to ambient; and
    modulating a flow of exhaust through the second turbine, thereby controlling a mass flow rate and pressure increase of air effected by the second compressor.

3. An air charge system for an internal combustion engine, the air charge system comprising:
    a charge path having a charge inlet configured to receive air, and a charge outlet configured to convey air to an intake of the internal combustion engine;
    a first compressor in the charge path, the first compressor being driven by a motor and configured to receive the air from the charge inlet and increase temperature, pressure and mass flow rate of the air in the charge path;
    a first valve in the charge path downstream of the first compressor configured to divert at least a portion of the air leaving the first compressor from exiting the charge path through the charge outlet during a start-up of the internal combustion engine;
    an inlet air heater, mounted on the charge path, for heating charge air entering the intake of the internal combustion engine during the start-up of the internal combustion engine; and
    a controller configured to modulate at least one of the first valve and a speed of the motor to adjust a volumetric flow rate of air leaving the charge outlet and entering the intake of the internal combustion engine, wherein the controller controls operation of the inlet air heater.

4. The air charge system of claim 3, further comprising at least one sensor configured to communicate with the controller and to measure at least one of temperature of the air in the charge path, pressure of the air in the charge path, mass flow of the air in the charge path, a speed of the first compressor, a speed of the internal combustion engine, a fuel flow to the internal combustion engine, and an operation mode of the internal combustion engine.

5. The air charge system of claim 3, further comprising:
    an exhaust path having an exhaust inlet configured to receive exhaust air from the internal combustion engine, and an exhaust outlet;
    a second compressor in the charge path, and a second turbine in the exhaust path, the second turbine being connected to drive the second compressor; and
    a charge cooler in the charge path downstream of the second compressor.

6. The air charge system of claim 5, further comprising:
    a first bypass path, connected to the charge path, to allow the air in the charge path to bypass at least one of the second compressor and the charge cooler, the first bypass path having a first variable bypass valve configured to adjust air flow through the first bypass path.

7. The air charge system of claim 6, wherein the controller is configured to modulate the first variable bypass valve to control a pressure drop and a temperature of the air in the charge path.

8. The air charge system of claim 7, wherein the first compressor is connected to includes a first turbine in the exhaust path;
the exhaust path includes a second bypass path connected thereto to modulate the air in the exhaust path around the first turbine, and the second bypass path includes a second variable bypass valve configured to modulate the flow rate of the air flowing through the second bypass path, and wherein the second variable bypass valve is modulated by the controller.

9. The air charge system of claim 5, further comprising a second motor connected to drive the second compressor, wherein the second motor connected to be controlled by the controller.

10. The air charge system of claim 5, wherein the charge path includes a primary charge path that includes the second compressor and the charge cooler; and
a bypass charge path, connected in parallel to the primary charge path, that includes the first compressor.

11. The air charge system of claim 10, wherein the bypass charge path includes the first valve.

12. The air charge system of claim 10, wherein the charge path includes a recirculation path configured to divert at least a portion of the air leaving the first compressor to a point upstream of the first compressor during a start-up of the internal combustion engine.

13. The air charge system of claim 12, wherein the recirculation path is connected to the primary charge path at a downstream end of the recirculation path and is connected to one of the primary charge path and the bypass charge path at an upstream end of the recirculation path.

14. The air charge system of claim 12, wherein the recirculation path includes a recirculation valve configured to modulate the flow of the air through the recirculation path, the recirculation valve being modulated by the controller.

15. The air charge system of claim 3, wherein the controller is configured to access at least one of data including operating characteristics of the internal combustion engine, and compressor maps, the controller configured to modulate at least one of the first valve and a speed of the motor to adjust a volumetric flow rate of air leaving the charge outlet, based on the at least one of the data and the compressor maps.

16. An air charge system for an internal combustion engine, the air charge system comprising:
a charge path having a charge inlet configured to receive air and a charge outlet configured to convey air to an intake of the internal combustion engine;
a first compressor in the charge path, the first compressor being driven by a motor and configured to receive the air from the charge inlet and increase temperature, pressure and mass flow rate of the air in the charge path;
a first valve in the charge path downstream of the first compressor configured to divert at least a portion of the air leaving the first compressor from exiting the charge path through the charge outlet during a start-up of the internal combustion engine;
an exhaust path having an exhaust inlet configured to receive exhaust air from the internal combustion engine, and an exhaust outlet;
a second compressor in the charge path;
a second turbine in the exhaust path, the second turbine being connected to drive the second compressor;
a charge cooler in the charge path downstream of the second compressor;
a second motor connected to drive the second compressor; and
a controller configured to modulate at least one of the first valve and a speed of the motor to adjust a volumetric flow rate of air leaving the charge outlet and entering the intake of the internal combustion engine, wherein the controller controls operation of the second motor.

17. An air charge system for an internal combustion engine, the air charge system comprising:
a charge path having a charge inlet configured to receive air, and a charge outlet configured to convey air to an intake of the internal combustion engine;
a first compressor in the charge path, the first compressor being driven by a motor and configured to receive the air from the charge inlet and increase temperature, pressure and mass flow rate of the air in the charge path;
a first valve in the charge path downstream of the first compressor configured to divert at least a portion of the air leaving the first compressor from exiting the charge path through the charge outlet during a start-up of the internal combustion engine;
an exhaust path having an exhaust inlet configured to receive exhaust air from the internal combustion engine, and an exhaust outlet;
a second compressor in the charge path, and a second turbine in the exhaust path, the second turbine being connected to drive the second compressor;
a charge cooler in the charge path downstream of the second compressor;
a first bypass path, connected to the charge path, to allow the air in the charge path to bypass at least one of the second compressor and the charge cooler, the first bypass path having a first variable bypass valve configured to adjust air flow through the first bypass path;
a first turbine in the exhaust path connected to the first compressor; the exhaust path includes a second bypass path connected thereto to modulate the air in the exhaust path around the first turbine, and the second bypass path includes a second variable bypass valve configured to modulate the flow rate of the air flowing through the second bypass path, and
a controller configured to modulate at least one of the first valve and a speed of the motor to adjust a volumetric flow rate of air leaving the charge outlet and entering the intake of the internal combustion engine,
wherein the controller is configured to modulate the first variable bypass valve to control a pressure drop and a temperature of the air in the charge path, and
wherein the second variable bypass valve is modulated by the controller.

18. An air charge system for an internal combustion engine of an aircraft, the air charge system comprising:
a charge path having an inlet configured to receive air from ambient, and an outlet configured to be connected to an intake of the internal combustion engine to convey air from the inlet to the intake of the internal combustion engine;
a first compressor in the charge path connected to receive air from the inlet;
a charge cooler in the charge path connected to receive air from the first compressor;
a second compressor in the charge path connected to receive air from the charge cooler;

a variable bypass valve connected to divert at least a portion of the air from the charge path upstream of the first compressor, around at least one of the first compressor and the charge cooler and back to the charge path during a start-up of the internal combustion engine; and a controller connected to the variable bypass valve and configured to vary an amount of air flowing through the variable bypass valve to control a temperature of charge air entering the intake of the internal combustion engine;

wherein during the start-up of the internal combustion engine at high altitudes above sea level, the variable bypass valve is opened to provide a maximum charge temperature to the intake of the internal combustion engine, to ensure ignition of the internal combustion engine, and wherein during a transition to steady-state operation, a steady state operation and a shutdown of the internal combustion engine, the variable bypass valve is closed to provide a minimum charge temperature to the intake of the internal combustion engine to increase air density.

19. The air charge system of claim 18, wherein the second compressor is driven by a motor.

20. The air charge system of claim 19, further comprising a second charge cooler in the charge path connected to receive air from the second compressor.

* * * * *